United States Patent
Pourbigharaz et al.

(10) Patent No.: US 10,082,860 B2
(45) Date of Patent: Sep. 25, 2018

(54) STATIC IMAGE POWER MANAGEMENT

(75) Inventors: Fariborz Pourbigharaz, Thornhill (CA); Carl Kazumi Mizuyabu, Markham (CA); Khosro M. Rabii, San Diego, CA (US); John Chi Kit Wong, Markham (CA); Gary Arthur Ciambella, Newmarket (CA); Chia-Yuan Teng, San Diego, CA (US); Tauseef Kazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 13/326,065

(22) Filed: Dec. 14, 2011

(65) Prior Publication Data

US 2013/0155090 A1    Jun. 20, 2013

(51) Int. Cl.
    G09G 5/02    (2006.01)
    G06F 1/32    (2006.01)

(52) U.S. Cl.
    CPC .......... *G06F 1/3265* (2013.01); *G06F 1/3218* (2013.01); *Y02D 10/153* (2018.01); *Y02D 50/20* (2018.01)

(58) Field of Classification Search
    CPC ............................. G09G 5/02; G06T 11/001
    USPC ........................................................ 345/589
    See application file for complete search history.

(56) References Cited

U.S. PATENT DOCUMENTS

| | | | |
|---|---|---|---|
| 5,844,535 A | 12/1998 | Itoh et al. | |
| 6,256,413 B1 * | 7/2001 | Hirabayashi | 382/232 |
| 6,476,822 B1 | 11/2002 | Burbank | |
| 6,903,732 B2 | 6/2005 | Adachi et al. | |
| 7,502,022 B2 * | 3/2009 | Ageishi et al. | 345/214 |
| 7,893,933 B2 | 2/2011 | Yi et al. | |
| 2002/0163523 A1 * | 11/2002 | Adachi et al. | 345/536 |
| 2005/0063586 A1 * | 3/2005 | Munsil et al. | 382/162 |

(Continued)

FOREIGN PATENT DOCUMENTS

| | | |
|---|---|---|
| CN | 1366231 A | 8/2002 |
| CN | 101149640 A | 3/2008 |

(Continued)

OTHER PUBLICATIONS

Kyungtae Han, Zhen Fang ; Diefenbaugh, P. ; Forand, R. ; Iyer, R.R. ; Newell, D., "Using checksum to reduce power consumption of display systems for low-motion content ", Computer Design, 2009. ICCD 2009. IEEE International Conference on, p. 47-53.*

(Continued)

*Primary Examiner* — Jin Ge
(74) *Attorney, Agent, or Firm* — Shumaker & Sieffert, P.A.

(57) ABSTRACT

This disclosure describes techniques for reducing power consumption of a display device. According to these techniques, a display device is configured to determine whether an image to be displayed by the display device has become static. In response to identifying such a static image, the display device may operate in a static image mode. According to the static image mode, the display device may read a current frame of image data, modify the current frame of image data to generate a modified frame of image data with a reduced size, and store the modified image data in memory. The display device may read the modified image data from memory to present the static image, which may reduce power consumption of the display device.

33 Claims, 7 Drawing Sheets

(56) References Cited

U.S. PATENT DOCUMENTS

| | | |
|---|---|---|
| 2005/0253868 A1 | 11/2005 | Ageishi et al. |
| 2006/0010404 A1 | 1/2006 | Mamba et al. |
| 2007/0115290 A1 | 5/2007 | Polzin et al. |
| 2008/0100636 A1* | 5/2008 | Lai et al. ............... 345/546 |
| 2008/0186266 A1 | 8/2008 | Takahashi |
| 2009/0046205 A1* | 2/2009 | Strasser et al. ............... 348/634 |
| 2009/0322969 A1 | 12/2009 | Unger |
| 2010/0167787 A1 | 7/2010 | Weisbrod |
| 2010/0208804 A1* | 8/2010 | Yu et al. ............... 375/240.12 |
| 2010/0245316 A1* | 9/2010 | Cheng ............... 345/211 |
| 2011/0078536 A1 | 3/2011 | Han et al. |
| 2011/0173472 A1 | 7/2011 | Ogura |
| 2011/0175895 A1 | 7/2011 | Hayakawa et al. |
| 2011/0227961 A1 | 9/2011 | Kikuta |
| 2013/0016114 A1* | 1/2013 | Rabii ............... 345/589 |

FOREIGN PATENT DOCUMENTS

| | | |
|---|---|---|
| EP | 0651367 A1 | 5/1995 |
| EP | 1431952 A1 | 6/2004 |
| EP | 2365417 A2 | 9/2011 |
| JP | H07121137 A | 5/1995 |
| JP | H095789 A | 1/1997 |
| JP | 2000187468 A | 7/2000 |
| JP | 2001034229 A | 2/2001 |
| JP | 2002318577 A | 10/2002 |
| JP | 2003108092 A | 4/2003 |
| JP | 2003224862 A | 8/2003 |
| JP | 2004151222 A | 5/2004 |
| JP | 2004363704 A | 12/2004 |
| JP | 2005049885 A | 2/2005 |
| JP | 2006023379 A | 1/2006 |
| JP | 2006251310 A | 9/2006 |
| JP | 2007101676 A | 4/2007 |
| JP | 2007214659 A | 8/2007 |
| JP | 2008191442 A | 8/2008 |
| JP | 2011170328 A | 9/2011 |
| JP | 2011197215 A | 10/2011 |
| KR | 20060047930 A | 5/2006 |
| TW | 201104410 A | 2/2011 |
| WO | 03100759 A1 | 12/2003 |

OTHER PUBLICATIONS

International Search Report and Written Opinion—PCT/US2012/065062—ISA/EPO—Apr. 25, 2013, 13 pp.

* cited by examiner

STATIC IMAGE POWER MANAGEMENT

TECHNICAL FIELD

This disclosure relates generally to the display of images. More specifically, this disclosure describes techniques for reducing power consumption of a display device.

BACKGROUND

A display device may include a display driver and a display engine that includes one or more frame buffers. To present images via a screen of the display device, the display driver may send frames of image data to the display engine to be temporarily stored in the one or more frame buffers. The display engine may read the stored image data from the one or more frame buffers to present images via the display screen. In some examples, such a display device may be operable using a limited internal power source, such as a battery.

SUMMARY

This disclosure is directed to techniques for reducing power consumption of a device that includes a display. For example, according to these techniques, a display device may detect when images to be presented by the display have become static, (i.e., unchanged from frame to frame). In response to detecting such a static image, the display device may operate one or more components of the display device, such as a display engine of the display device, in a static image mode. In some examples, the static image mode may include reducing an operating frequency and/or supply voltage of the one or more components. In other examples, the static image mode may also, or instead, include reading at least one current frame of image data from at least one frame buffer of the display device, modifying the image date to reduce power consumption of the display device to present the static image, and writing the modified image data to the at least one frame buffer (or a different frame buffer). According to this example, while in the static image mode, the display engine of the display device may continue to read the modified image data stored in the at least one frame buffer, to present the static image.

For example, a method is described herein. The method includes operating a display device in a standard mode to display images. The method further includes comparing a current frame of image data to at least one previous frame of image data. The method further includes determining that the current frame of image data comprises a static image based on the comparison. The method further includes responsive to determining that the current frame of image data comprises a static image, modifying the current frame of image data to generate a modified frame of image data. The method further includes storing the modified frame of image data in a memory. The method further includes operating the display device in a static image mode, wherein the static image mode comprises reading the modified frame of image data from the memory to present the static image.

According to another example, a display device is described herein. The display device includes a static image module. The static image module includes a static image determination module configured to compare a current frame of image data to at least one previous frame of image data, and determine that the current frame of image data comprises a static image based on the comparison. The static image module further includes a static mode module configured to, responsive to determining that the current frame of image data comprises a static image, modify the current frame of image data to generate a modified frame of image data. The static mode module is further configured to store the modified frame of image data in a memory. The static mode module is further configured to operate the display device in a static image mode, wherein the static image mode comprises reading the modified frame of image data from the memory to present the static image.

According to another example, a display device is described herein. The device includes means for operating a display device in a standard mode to display images. The device further includes means for comparing a current frame of image data to at least one previous frame of image data. The device further includes means for determining that the current frame of image data comprises a static image based on the comparison. The device further includes means for, responsive to determining that the current frame of image data comprises a static image, modifying the current frame of image data to generate a modified frame of image data. The device further includes means for storing the modified frame of image data in a memory. The device further includes means for operating the display device in a static image mode, wherein the static image mode comprises reading the modified frame of image data from the memory to present the static image.

According to another example, a computer-readable storage medium that stores instructions is described herein. The instructions are configured to cause a computing device to operate a display device in a standard mode to display images. The instructions are further configured to cause the computing device to compare a current frame of image data to at least one previous frame of image data. The instructions are further configured to cause the computing device to determine that the current frame of image data comprises a static image based on the comparison. The instructions are further configured to cause the computing device to responsive to determining that the current frame of image data comprises a static image, modify the current frame of image data to generate a modified frame of image data. The instructions are further configured to cause the computing device to store the modified frame of image data in a memory. The instructions are further configured to cause the computing device to operate the display device in a static image mode, wherein the static image mode comprises reading the modified frame of image data from the memory to present the static image.

The details of one or more examples of this disclosure are set forth in the accompanying drawings and the description below. Other features, objects, and advantages of the techniques described herein will be apparent from the description and drawings, and from the claims.

DETAILED DESCRIPTION

This disclosure is directed to techniques for reducing power consumption of a device that includes a display. For example, according to these techniques, a display device may be configured to detect when images presented by the display have become static, (i.e., unchanged from frame to frame). In response to detecting such a static image, the display device may operate one or more components of the display device, such as a display engine of the display device, in a static image mode. In some examples the static image mode may include reducing an operating frequency and/or supply voltage of the one or more components. In other example, the static image mode may also or instead include reading at least one current frame of image data from at least one frame buffer of the display device, modifying the image date to reduce power consumption of the display device to present the static image, and writing the modified image data to the at least one frame buffer (or a different frame buffer). According to this example, while in the static image mode, the display engine of the display device may continue to read the modified image data stored in the at least one frame buffer to present the static image. In some examples, the display device operating in such a static image mode may further determine that an image to be presented is no longer static. According to these examples, the display device may exit the static image mode to operate in a standard mode of operation to present images via the display.

Figure 1:
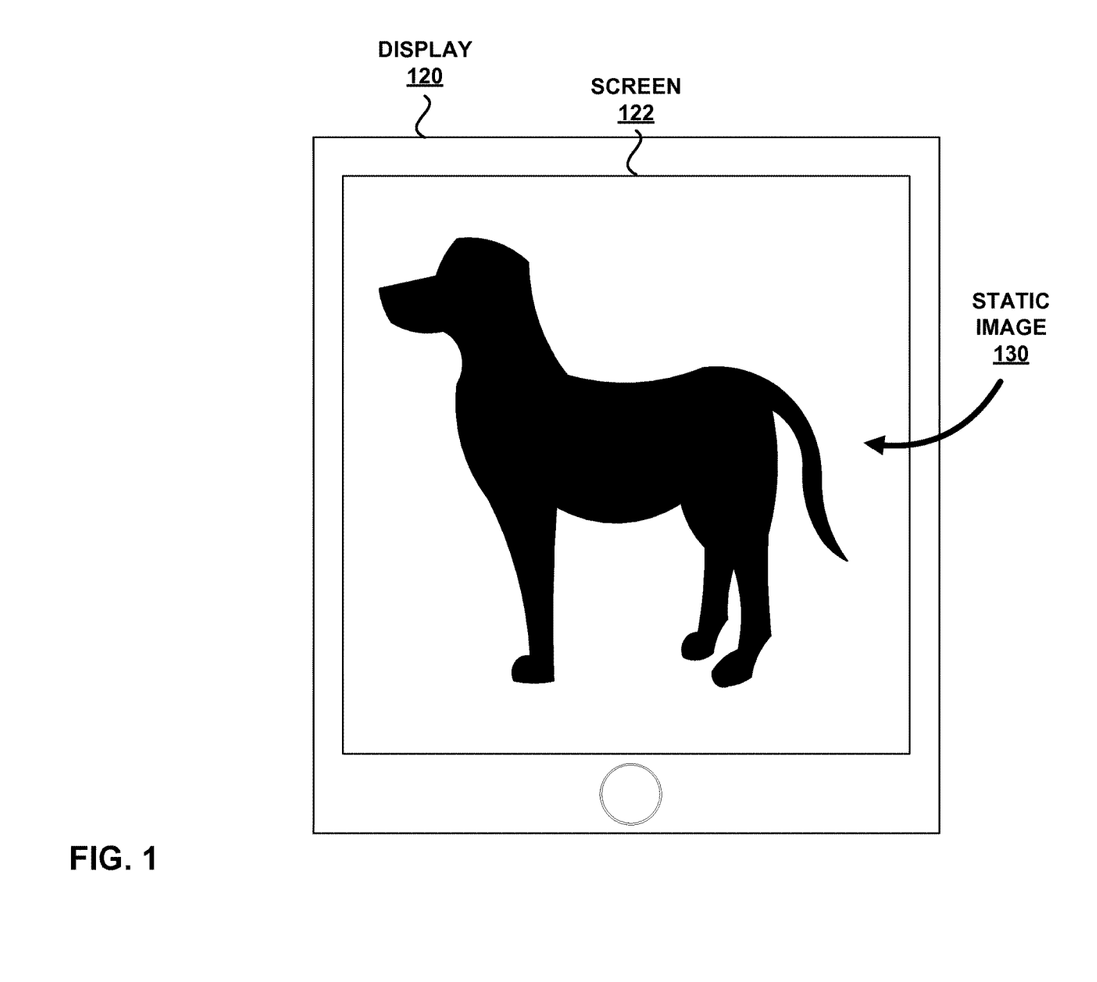
FIG. 1 is a conceptual diagram that illustrates one example of a display device configured to operate in a static image mode consistent with the techniques described herein.

FIG. 1 is a conceptual diagram that illustrates one example of a display device 120 configured to operate in a static image mode consistent with the techniques described herein. The example of FIG. 1 depicts a display device 120 that comprises a tablet computer or smartphone device that includes a display 122. The display device 120 depicted in FIG. 1 is merely one example of a display device that may be configured to detect a static image and operate in a static image mode consistent with the techniques described herein. For example, display device 120 may include a laptop computer, television display (e.g., liquid crystal (LCD) display, plasma display), wearable display (e.g., a watch display), a desktop computer display, portable gaming device, global position system (GPS) device, or any other device that includes a display. According to each of these examples, the respective display device 120 may be configured to detect a static image, and operate in a static image mode responsive to detecting a static image.

As shown according to the example of FIG. 1, display device 120 may be configured to output one or more images via display 122. In some examples, display device 120 may be configured to output images as sequential frames of an image sequence. Display device 120 may include a display engine, one or more frame buffers, and a display driver. The display engine may be configured to receive one or more indications of images to be output via display 122 from one or more sources, and write image data representing frames of the one or more images to the one or more frame buffers. The display driver may read the image data from the one or more frame buffers, and operate the display 122 to present images consistent with the image data. For example, the display driver may be configured to sequentially read frames of image data from the one or more frame buffers based on a clock reference, and use the frames of image date to present frames of an image via display 122.

In some examples, display device 120 as described herein may be configured to operate using a limited internal power source, such as one or more batteries. For example, display device 120 may comprise a smartphone, tablet computer or other device configured to operate using an internal battery when not connected to an external power source. According to these examples, it may be desirable to reduce power consumption used by display device 120 to present images via display 122, to increase a battery life of display device 120 and thereby improve a user experience when using display device 120.

In some examples, a display driver of a display device 120 may continue to sequentially read image data from one or more frame buffers, regardless of a content of the frame buffers, and use the read image data to present frames of an image via display 122. In some examples, sequentially reading image data by a display engine from one or more frame buffers, even where a display image is static, may consume a substantial amount power and thereby limit a battery life of display device 120, when display device 120 is used to present a static image via display 122.

According to the techniques described herein, display device 120 may be configured to detect whether a static image 130 is being or is to be presented by display 122. Such a static image 130 may be described as an image that includes two or more substantially similar consecutive frames. In some example, display device 120 may use one or more techniques to compare consecutive frames of an image to one another to determine whether or not the frames comprise a static image. For example, display device 120 may be configured to perform a cyclic redundancy check (CRC) to compare a current frame of image data to a previous frame of image data, to determine whether any differences exist between the current and previous frames. In some examples, display device 120 may include a counter configured to count a number of consecutive frames of an image that are substantially the same. In some examples, display device 120 may compare such a counted number of substantially similar consecutive images to one or more thresholds, to determine whether the displayed image is a static image. In some examples, if the counted number of substantially similar consecutive frames of the image is equal to or greater than the threshold, the display device 120 may determine that a static image 130 is being presented via display 122.

In response to detecting such a static image 130, display device 120 may operate in a static image mode. For example, in such a static image mode, display device 120 may reduce an operating speed and/or operating voltage of one or more components, such as a display engine of the display device 120. In other examples, in such a static image mode, display device 120 may read a current frame of a static image from one or more frame buffers, modify the current frame to generate a modified frame of image data, and write the modified frame of image data to the one or more frame buffers (or a different frame buffer). For example, display device 120 may modify the current frame of the static image to reduce a size of the current frame (e.g., reduce a number of bits of the current frame).

Once such a modified frame of image data has been written to the one or more frame buffers, the display driver of display device 120 may read the modified image data from the one or more frame buffers to cause the display to present the static image. According to these examples, because the display engine may read the modified image data with a reduced size, instead of the current frame of the static image described above, power consumed by the display engine to read the static image from the one or more frame buffers may be reduced. According to these examples, reducing power consumption of display device 120 (e.g., power consumption of the display engine), by operating display device 120 in a static image mode as described above, may increase a battery life of display device 120, which may thereby improve a user experience when using display device 120.

In addition, according to the techniques of described herein, a display device 120 may be configured to detect a static image by monitoring the contents of one or more frame buffers of the display device 120. In some examples, detecting a static image by monitoring the contents of one or more frame buffers as described herein may be advantageous, because display device 120 may detect a static image, regardless of a source of image data to be presented via display 122. For example, display device 120 may detect such a static image, regardless of whether the static image was received (e.g., by a display driver) from one or more software applications executing on a processor of display device 120, a graphics processing module of the display device 120, or another source of image data.

In some examples, when operating in a static image mode as described above, display device 120 may be configured to detect that an image to be displayed by display device 120 is no longer static. For example, display device 120 may determine that at least two consecutive frames of an image to be displayed are different from one another. For example, display device 120 may determine that the at least two consecutive frames of the image data are different from one another based on performing a CRC check on the frames, as described above. According to these examples, if display device 120 determines that an image to be displayed by display device 120 is no longer static, display device 120 may exit the static image mode, and return to a standard mode of operation to present images, until another static image 130 is identified by display device 120.

Figure 2:
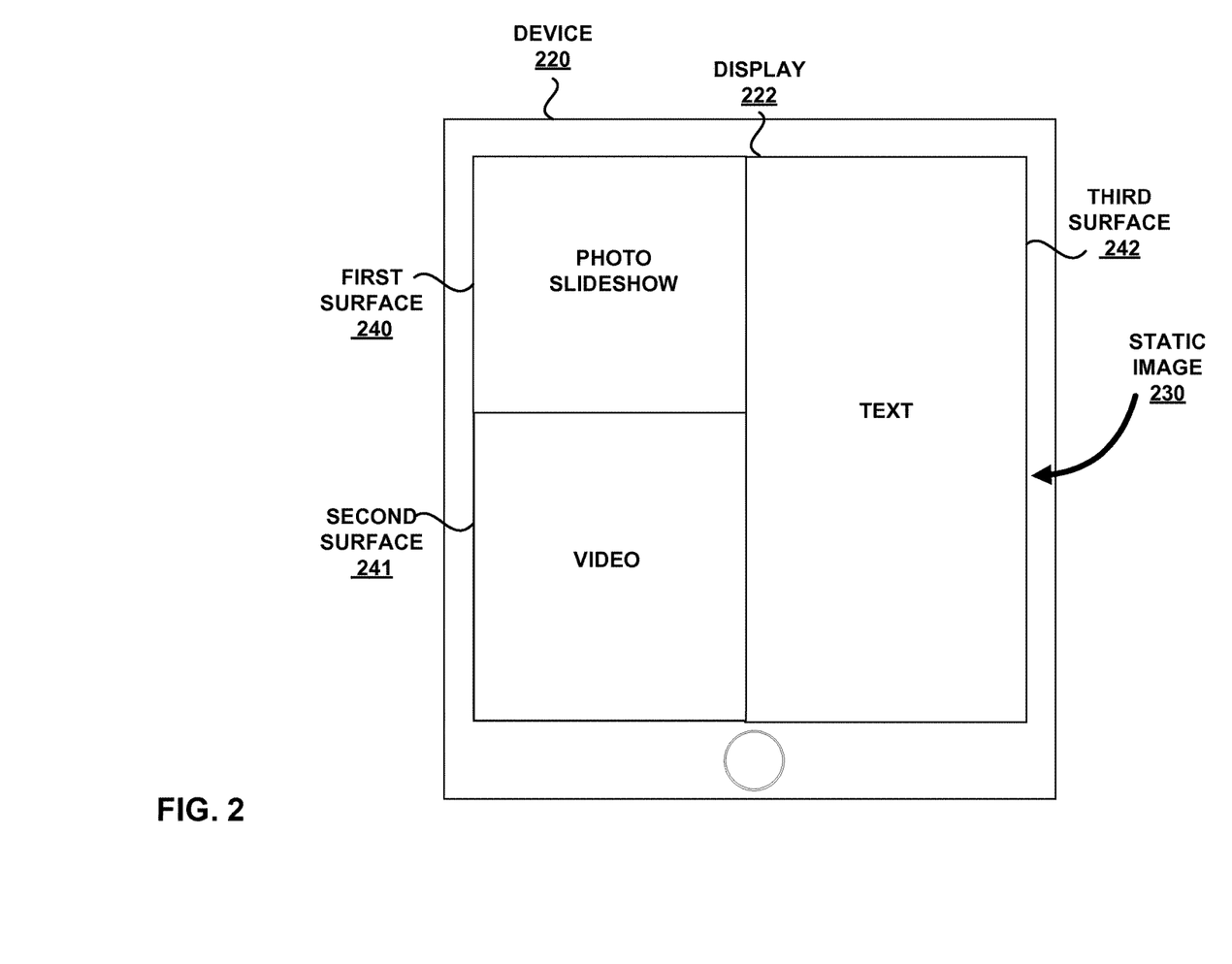
FIG. 2 is a conceptual diagram that illustrates one example of a display device configured to operate in a static image mode to present a multi-surface image consistent with the techniques described herein.

FIG. 2 is a conceptual diagram that illustrates one example of a display device 220 configured to operate in a static image mode to present a static multi-surface image 230 consistent with the techniques described herein. According to the example of FIG. 1 discussed above, display device 120 is configured to present a single static image 130 using a single surface that comprises all or most of display 122 of device 120. According to other examples, such as the example of FIG. 2, a display device 220 as described herein may be configured to present an image that comprises multiple surfaces 240-242. For example, as shown in FIG. 2, display device 220 is configured to provide an output image that includes a first surface 240 that comprises a photo slideshow, a second surface 241 that comprises a video, and a third surface 242 that comprises textual output.

In some examples, each of the image portions presented as the respective surfaces 240-242 may be received from different sources. For examples, the photo slideshow presented as first surface 240 may be received by a display engine from a photo application executing on display device 220 based on photo data stored by display device 220, or received from another computing device. As another example, the video presented as second surface 241 may be received by a display driver from a video application executing on display device 220 based on video data stored on display device 220, or received from another computing device. As another example, the textual output presented as third surface 242 may be received by the display driver from an electronic mail (e-mail), text messaging, electronic book, RSS reader, word processing application, or other of application executing on display device 220.

In some examples, display device 220 may include multiple frame buffers that each correspond to the respective surfaces of a multi-surface image presented by the display 222. For example, display device 220 configured to present a multi-surface image such as depicted in FIG. 2 may include three frame buffers, each dedicated to each of the three the respective surfaces 240-242.

The example of FIG. 2, where display device 220 is operated to present three surfaces 240-242, is provided for exemplary purposes only. In other example, display device 220 may be configured to present a multi-surface image that includes more, or fewer, surfaces than depicted in the example of FIG. 2. In some examples, such a multi-surface image may be configurable by a user, such as via user input received by display device 220, to change a number, size, and/or content of the multiple surfaces. According to these examples, display device 220 may be configured to modify a number and/or size of one or more frame buffers used to present images. For example, if a multi-surface image includes four surfaces, display device 220 may allocate memory resources as four frame buffers for use to present the multi-surface image.

According to some aspects, the techniques described herein may provide for detecting whether a multi-surface image presented by display 222 is a static image 230 and, in response to detecting the multi-surface image is a static image, causing display device 220 to operate in a static image mode. For example, display device 220 may be configured to perform a CRC check on image data representing each of the respective surfaces 240-242, and if the CRC check indicates that at least two consecutive frames of each of the respective surfaces 240-242 are substantially similar, display device 220 may determine that a static image 230 is being presented via display 222. For example, display device 220 may generate a first cyclic redundancy code associated with a current frame of image data, and generate a second cyclic redundancy code associate with a previous frame of image data. Display device 220 may compare the generated first and second cyclic redundancy codes to one another, to determine whether an image has changed between the frames.

In some examples, display device 220 may include one or more counters configured count a number of times consecutive frames of each of the respective surfaces 240-242 are substantially similar. If such a counted number of times exceed a predetermined threshold, display device 220 may determine that a multi-surface static image 230 is being presented via display 222.

In some examples, operating display device 220 in such a static image mode may include reading a current frame of comprising image data stored in the multiple frame buffers (that correspond to the respective frames), modifying the image data to generate a modified frame of image data, and storing the modified image data in at least one frame buffer (e.g., at least one of the multiple frame buffers, or one or more other frame buffers). For example, display device 220 may generate the modified image data to reduce a size (e.g., a number of bits) relative to the current frame of image data. According to these examples, in the static image mode, a display driver of display device 220 may continue to read the modified image data from the at least one frame buffer, in order to present the static image 230 via display 222, which may reduce an amount of power consumed to present the static image 230.

In some examples, where a display device 220 is configured to present a multi-surface image 230 as depicted in FIG. 2, the display device 220 may further be configured to, in the static image mode, modify current display frame buffers—by combining image data representing the respective surfaces to generate a single surface of modified image data that comprises all of the respective surfaces. For example, display device 220 may generate the modified image data such that a single modified surface of image data that includes the respective surfaces 240-242 is stored in the at least one frame buffer. According to these examples, in the static image mode, a display driver of display device 220 may continue to read the modified image surface from the at least one frame buffer, in order to present the static image 230 via display 222, which may reduce an amount of power consumed to present the multi-surface static image 230.

Figure 3:
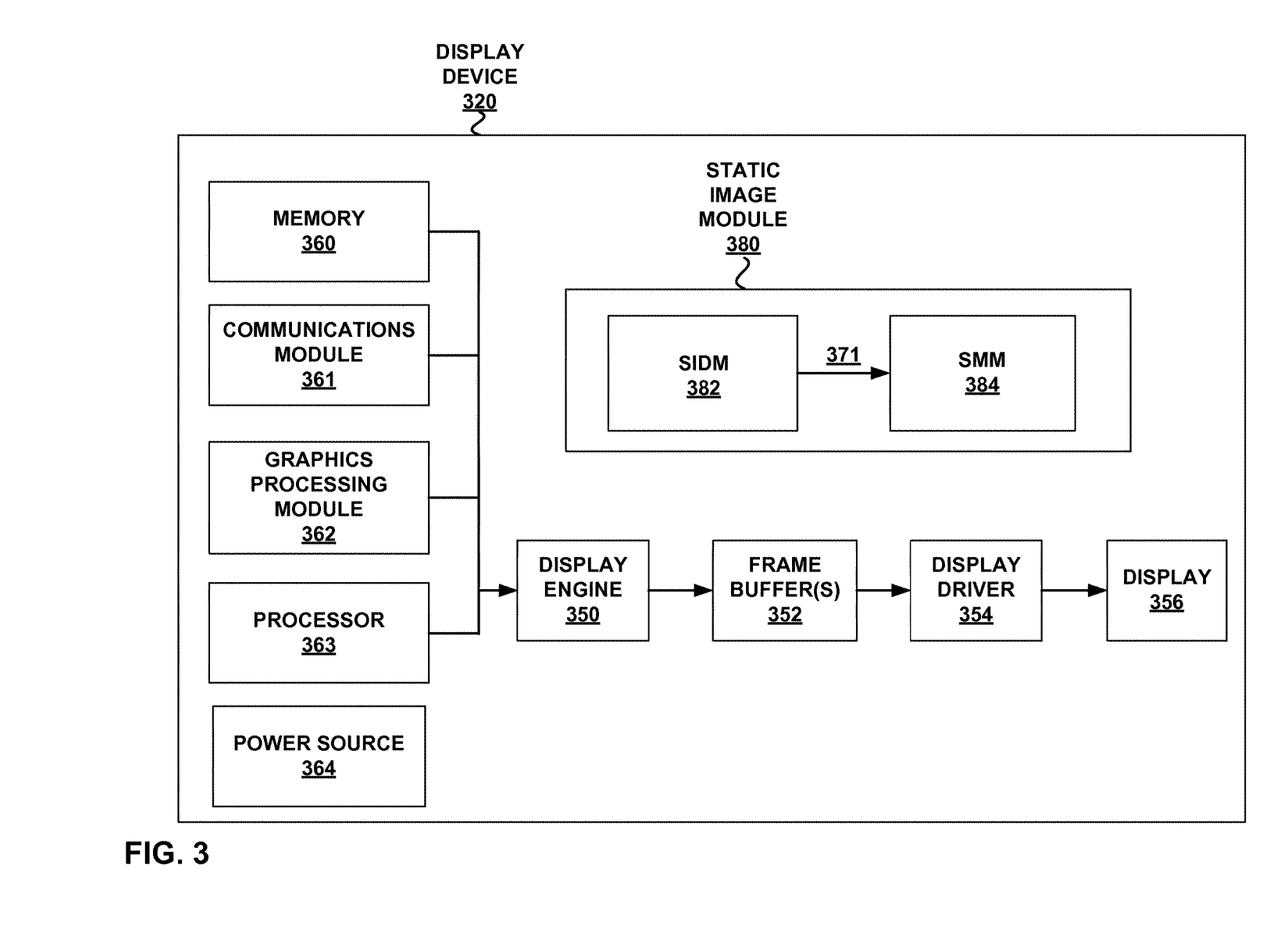
FIG. 3 is a block diagram that illustrates one example of a display device configured to operate in a static image mode consistent with the techniques described herein.

FIG. 3 is a block diagram that illustrates one example of a display device 320 configured to detect a static image and operate in a static image mode consistent with the techniques described herein. As shown in the example of FIG. 3, display device 320 includes at least one data storage module 360, at least one communications module 361, at least one graphics processing module 362, at least one processor 363, and at least one power source 364. Data storage module 360 may include one or more components of display device 320 configured to store data and/or instructions. For example, data storage module 360 may comprise one or more components such as a magnetic hard drive component, FLASH memory component, random access memory (RAM) component, or any other component configured to store instructions and/or data. Processor 363 may comprise one or more components of display device 320 configured to execute one or more instructions (e.g., computer software) stored in data storage module 360. For example, processor 363 may be configured to execute one or more software applications configured to cause display device 320 to output one or more images via a display 356 of display device 320. For example, processor 363 may include one or more of a central processing unit (CPU), application specific integrated circuit (ASIC), field programmable gate array (FPGA), or other component configured to execute instructions to cause display device 320 to operate.

As also depicted in FIG. 3, display device 320 may, in some examples, include a graphics processing module 362. Graphics processing module 362 may comprise one or more components of display device 320 configured to receive higher level graphics commands (e.g., according to the OPEN GL standard for graphics processing), and generate image data based on the received higher level graphics commands.

As also shown in FIG. 3, display device 320 includes display engine 350, one or more frame buffer(s) 352, display driver 354, and a display 356. Display 356 may comprise any component that may be used to present one or more images to a viewer. For example, display may include a liquid crystal display (LCD), a plasma display, a light emitting diode (LED) display, an e-ink display, or any other type of display component used to present images to a user.

Display device 320 may use display engine 350, one or more frame buffer(s) 352, and display driver 354 to present one or more images via display 356. For example, display engine 350 may receive image data to be output by display 356 from one or more sources, and write the received image data to the one or more frame buffer(s) 352. Display driver 354 may read image data stored in the one or more frame buffer(s) 352, and control display 356 to present one or more images based on the read image data. For example, display driver 354 may sequentially read frames of image data stored in the one or more frame buffer(s) 352 consistent with a clock reference (not depicted in FIG. 3) of display device 320, to present one or more frames of an image sequence via display 356.

According to the example of FIG. 3, display engine 350 and display driver 354 are shown as separate functional blocks that perform the respective functions of processing and writing image data to frame buffer(s) 352 and sequentially reading frames of image data from frame buffer(s) 352. In some examples, the respective functions attributed to display engine 350 and display driver 354 as described here in may performed by the same, or a different component of display device 320. For example, display device 320 may include a first hardware and/or software component configured to operate as display engine 350 as described herein, and a second component configured to operate as a display driver 354 as described herein. In other examples, display device 320 may include a single hardware and/or software component configured to perform the functions attributed to both of display engine 350 and display driver 354 as described herein. Furthermore, the functionality associated with any module or unit depicted in FIG. 3, or elsewhere in this disclosure, may be implemented with the same, or multiple, hardware and/or software components.

Power source 364 of display device 320 may be configured to store power used by one or more components of display device 320 for operation. For example, power source 364 may comprise a battery or other power source that stores energy (e.g., electrical energy) for use by one or more of data storage module 360, communications module 361, graphics processing module 362, processor 363, display engine 350, one or more frame buffer(s) 352, display driver 354, display 356, image comparison module 358, and/or static image module 353. In some examples, it may be desirable to reduce an amount of power stored by power source 364 that is used to present images via display 356. For example, it may be desirable to reduce an amount of power used to present images via display 356 to increase a battery life of power source 364, which may improve a user experience when using display device 320.

As depicted in FIG. 3, display device 320 also includes a static image module 380 consistent with the techniques of this disclosure. Static image module 380 may be configured to reduce power consumption of display device 320 when display device is operating to present a static image via display 356. According to the example of FIG. 3, static image module 380 may include a static image detection module (SIDM) 382, and a static mode module (SMM) 384.

SIDM 382 may detect when an image to be displayed via display 356 has become static. For example, SIDM 382 may be configured to compare two or more sequential frames of an image to one another, to detect whether an image to be presented via display 356 has become static, for example as described in further detail below with respect to FIG. 4. If SIDM 382 does determine that an image to be presented via display 356 has become static, SIDM 382 may send an indication 370 of the static image to SMM 384. In response, SMM 384 may cause display device 320 in a static image mode, as described in further detail below with respect to FIG. 5.

Various functional components of display device 320, including communications module 361, graphics processing module 362, display engine 350, display driver 354, and static image module 380 (including SIDM 382 and SMM 384) are described as individual component or modules configured to operate according to the functionality described herein. One or more components of display device 320 described herein may be implemented using specific hardware configured to operate as described above. In other examples, one of more of the components of display device 320 as described herein may be implemented via programmable software configured to execute on a processor components of display device 320. In still other examples, on or more components of display device 320 may implemented using any combination of hardware and/or executable software configured to operated as described herein. In still other examples, a single component may be configured to operate to provide the functionality of multiple functional components depicted in FIG. 3. For example, the functionality attributed herein one or more of display engine 350, display driver 354, and/or static image module 380 may be performed by a single component, or multiple components.

Figure 4:
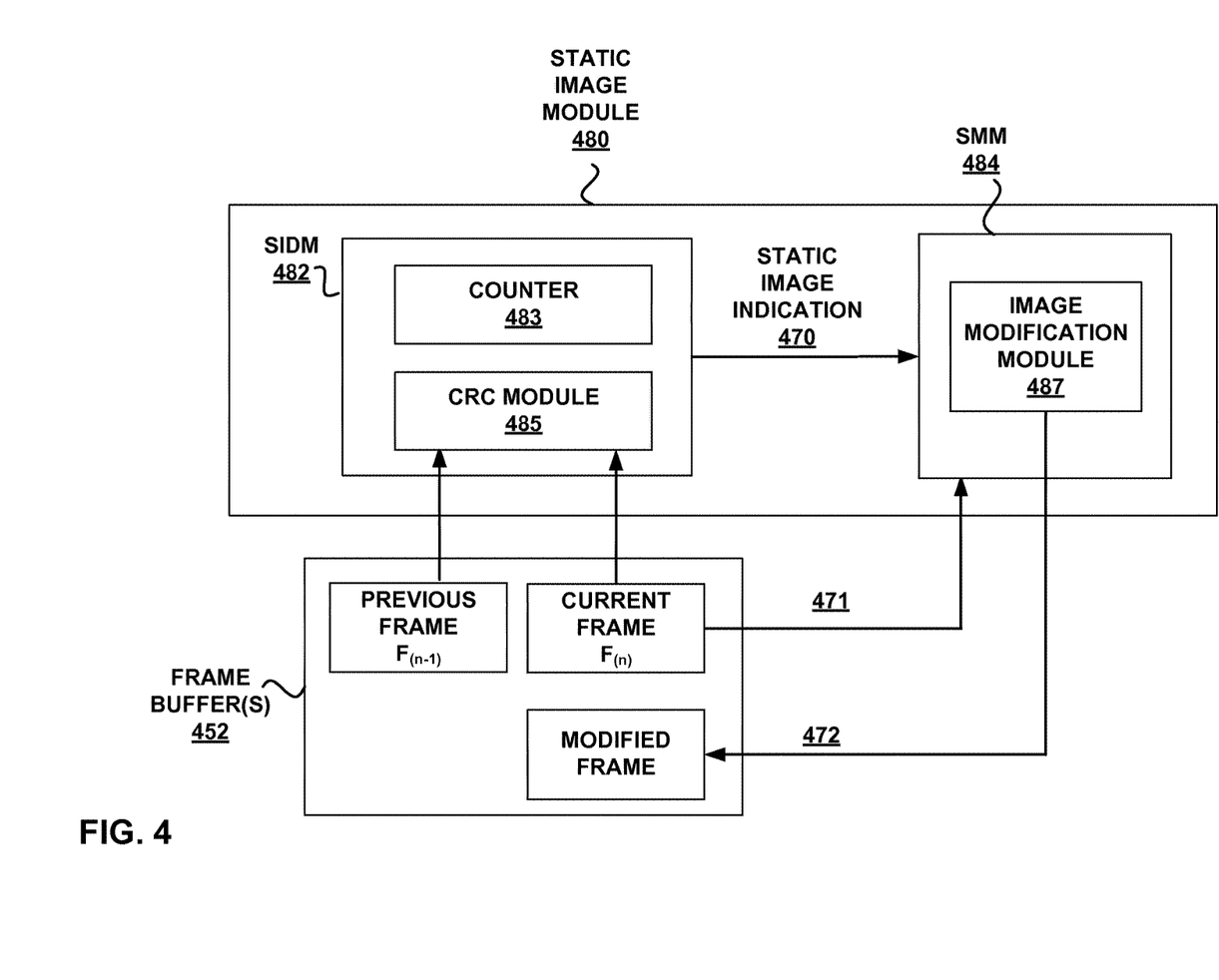
FIG. 4 is a block diagram that illustrates one example of a display device that includes a static image module configured to cause a display device to operate in a static image mode consistent with the techniques described herein.

FIG. 4 is a block diagram that illustrates one example of an static image module 480 configured to detect that an image to be presented via a display (e.g., display 356 depicted in FIG. 3) has become static, and in response to such an indication, operate in a static image mode consistent with the techniques described herein. As depicted in the example of FIG. 4, static image module 480 includes a static image detection module (SIDM) 482, and a static mode module (SMM) 484.

SIDM 482 may be configured to determine whether an image to be presented by a display has become static, and, if an image to be presented by the display has become static, generate an indication of the static image 470. SIDM 482 may send the indication to SMM 384. In response to such an indication, SMM 484 may cause display device 320 to operate in a static image mode. For example, in such a static image mode, SMM 384 may, in response to such an indication of a static image, reduce a supply voltage and/or operating frequency of one or more components of device 320, such as display engine 350, display driver 354, and/or display 356. As one example, SMM 484 may reduce an operating frequency of display driver 354 from 60 frames per second in a standard operating mode, to 30 frames per second in the static image mode. As another example, SMM 384 may reduce an operating voltage of display engine 350, display driver 354, and/or display 356. As another example, SMM 384 may reduce a brightness of display 356, including a brightness of pixels presented via display 356 and/or a backlight of display 356. In some examples, SMM 384 may also or instead be configured to modify a current frame of image data stored in frame buffer(s) 352, to reduce power consumption of display device 320 to present the determined static image.

In some example, as depicted in FIG. 4, SIDM 482 may include a CRC module 485 and a counter 483. CRC module 485 may be configured to compare two or more sequential frames of an image to one another by performing a cyclic redundancy check (CRC) on one or more current and previous frames of an image, to determine whether a presented image represented by the current and previous frames has changed. For example, CRC module 485 may generate a first cyclic redundancy code associated with a current frame of image data, and generate a second cyclic redundancy code associate with a previous frame of image data. CRC module 485 may compare the generated first and second cyclic redundancy codes to one another, to determine whether an image has changed between the frames. In some examples, CRC module 485 may compare the sequential frames to one another, while both a current and previous frame are stored in a memory, such as frame buffer(s) 452. In other examples, CRC module 485 may generate a first cyclic redundancy check to generate a first cyclic redundancy code for a previous frame of image data, and when the previous frame of data has been overwritten by the current frame of data, generate the second cyclic redundancy code, and compare the first and second cyclic redundancy codes. In other examples, SIDM 482 may use other techniques to determine whether or not two or more sequential frames of an image to be presented are substantially similar.

According to the example of FIG. 4, CRC module 485 may read, from frame buffer(s) 452, a current frame $F_n$ of an image, and a sequentially previous frame $F_{n-1}$ of an image to be presented by a display (e.g., display 356 depicted in FIG. 3). CRC module 485 may perform a cyclic redundancy check on the current frame $F_n$ and the previous frame $F_{n-1}$, to determine whether there are any differences between the current and previous frame.

As also shown in the example of FIG. 4, SIDM 482 also includes a counter 483. In some examples, as sequential frames of image data are read from frame buffer(s) 452 by display driver 354, SIDM 482 (e.g., using CRC module 485) may compare the current and previous frames to one another, to determine whether the frames are different. If SIDM 482 determines that current and previous frames are substantially similar to one another (e.g., using CRC module 485), SIDM 482 may update counter 483. According to these examples, if a value of counter 483 exceeds a threshold value, SIDM 382 may determine that a static image is to be presented via display 356. Such a threshold value may comprise a predetermined or adaptively updated value that indicates a number of substantially similar consecutive frames of image data SIDM 482 may use to determine whether an image to be presented by display 356 has become static.

In this manner, SIDM 482 may detect whether an image to be presented via display 356 may have become static. If SIDM 482 does determine that an image to be presented via display 356 has become static, SIDM 482 may send an indication of the static image to SMM 484. SMM 484 may cause display device 320 to operate in a static image mode. In some examples, before SIDM 482 determines that an image has become static, SIDM 482 may issue an interrupt to processor 363 that may indicate that image to be presented has become static. According to this example, processor 363, which may be executing one or more operating system applications and/or device drivers, may determine whether there are any outstanding calls to present any different images via display 356. For example, processor 363 may check for outstanding calls for new buffer addresses. If there are no such outstanding calls, SIDM 482 may cause display device 320 to operate in the static image mode.

In such a static image mode, SMM 484 may, in response to such an indication of a static image, reduce a supply voltage and/or operating frequency of display driver 354. In some examples, SMM 484 may, also or instead, modify a current frame of image data stored in frame buffer(s) 452, to reduce power consumption of display device 320 to present the determined static image.

For example, as depicted in FIG. 4, SMM 484 includes an image modification module (IMM) 487. IMM 487 may be configured to read a current frame of image data 471 stored in one or more frame buffer(s) 452, and modify the current frame of image data 471 to generate modified image data 472 with a reduced size (e.g., reduced number of bits stored in memory), in comparison to the current frame of image data 471. SMM 484 may write the modified frame of image data 472 to the one or more frame buffer(s) 452.

According to these examples, in the static image mode, display driver 354 may read the modified image data from the one or more frame buffer(s) 452 (and/or another frame buffer) to present the static image via display 356, instead of the current frame of image data. Because the modified image data is smaller than the current frame of image data, display driver 354 may consume less power when reading data from frame buffer(s) 352 to control display 356 to present the static image. In this manner, a battery longevity of display device 320 may be increased, which may improve a user experience when using display device 320.

In some examples, SMM 484 may generate modified image data 472 and write the modified image data to the one or more frame buffer(s) 452 only once when an image to be presented has been determined to be static. According to these examples, display driver 354 may read the modified image from the one or more frame buffer(s) 452 until an image to be presented is no longer static. For example, display driver 354 may read the modified image from the one or more frame buffer(s) 452 until SIDM 482 determines that an image to be presented is no longer static, e.g., based on a CRC check performed by CRC module 485, as described above.

Figure 5:
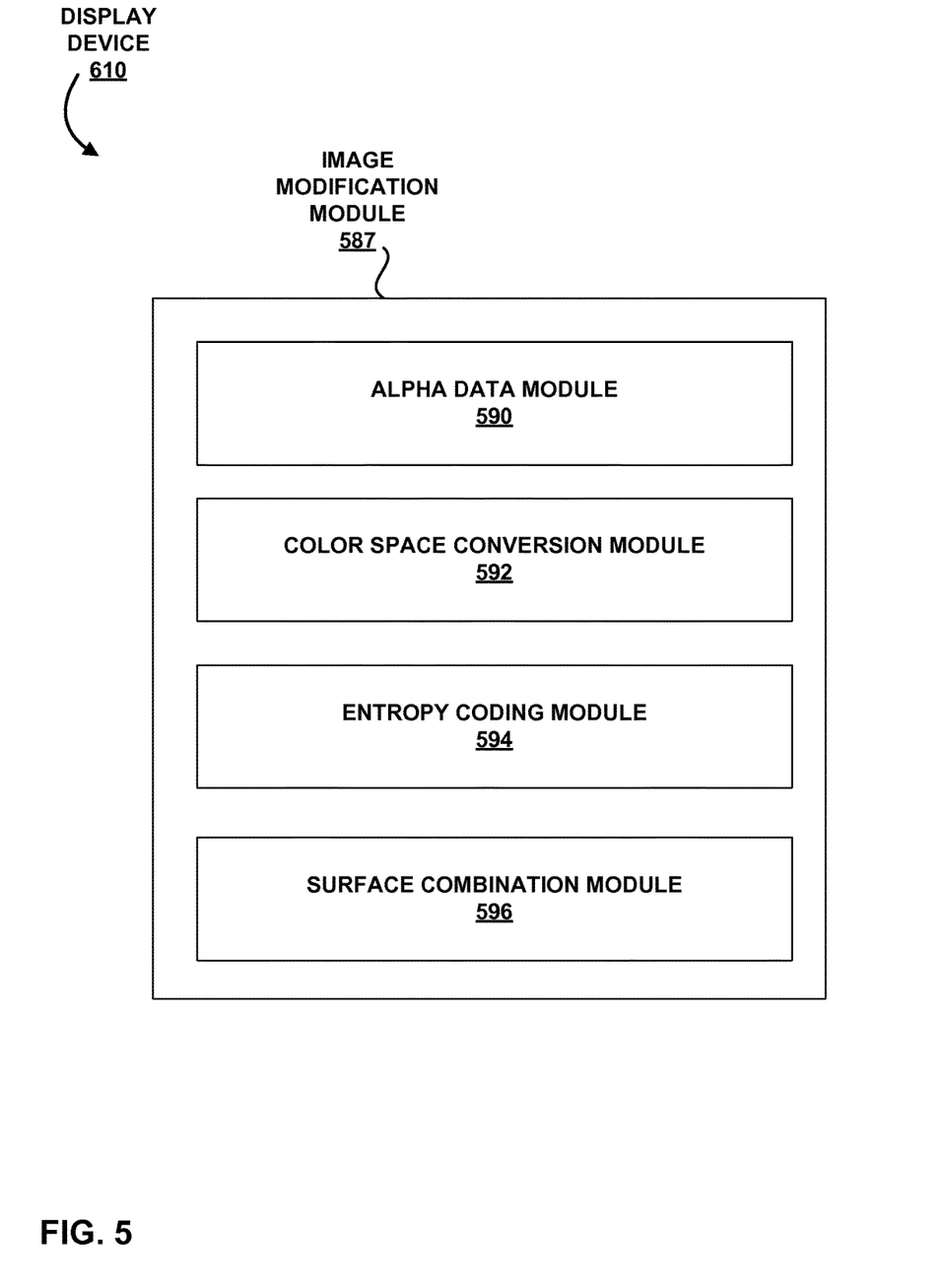
FIG. 5 is a block diagram that illustrates one example of an image modification module consistent with the techniques described herein.

FIG. 5 is a block diagram that depicts one example of an image modification module (IMM) 587 of a display device, such as display device 320 depicted in FIG. 3. As depicted in the example of FIG. 5, IMM 587 may include one or more of a plurality of modules that may each be used, alone or in combination, to modify a current frame of image data 471 to generate a modified frame of image data 472 as depicted in FIG. 4.

For example, as shown in FIG. 5, IMM 587 includes alpha data module (ADM) 590. ADM 590 may be configured to modify a current frame of image data 471 by generating a modified frame of image data that includes a reduced number of bits in comparison to the current frame of image data. For example, ADM 590 may be configured to remove alpha information, which may indicate transparency of a presented image, from a current frame of image data 371 to generate a modified frame of image data 372. For example, where the current frame of image data comprises a 32 bit per pixel red green blue alpha color space, ADM 590 may remove the alpha information, to generate a modified frame of image data 372 that comprises a 24 bpp RGB color space. In some examples, such alpha information may comprise alpha information associated with an entire frame or frames of an image, and/or alpha information associated with one or more pixels of one or more frames of an image.

As also depicted in FIG. 5, IMM 587 may further include a color space conversion module CSCM 592. CSCM 592 may be configured to modify a current frame of image data 471 by generating a modified frame of image data that includes a reduced number of bits in comparison to the current frame of image data. For example, CSCM 592 may convert image data that comprises a 32 bpp or 24 bpp RGB color space to a 16 bpp RGB color space. According to another example, CSCM 592 may convert image data from an RGB color space to a subsampled color space comprising luma and chroma blocks. For example, CSCM 592 may convert image data comprising a 32, 24, and/or 16 bpp RGB color space to generate modified image data 372 that comprises a YcbCr 4:2:2 and/or YcbCr 4:2:0 color space.

As also depicted in FIG. 5, IMM 587 may further include an entropy coding module (ECM) 594. According to this example, ECM 594 may modify a current frame of image data 471 by generating an entropy encoded modified frame of image data that includes a reduced number of bits in comparison to the current frame of image data. For example, ECM 594 may utilize one or more lossy or lossless entropy encoding technique to entropy encode the modified frame of image data. For example, ECM 594 may utilize one or more of variable length coding (VLC), context adaptive variable length coding (CABAC), or other entropy encoding techniques to generate an entropy encoded modified frame of image data. According to these examples, display driver 354 depicted in FIG. 3 may include a corresponding entropy decoding module. Such an entropy decoding module may be configured to read the entropy encoded modified image data to reconstruct the image data.

As also depicted in FIG. 5, IMM 587 may further include a surface combination module (SCM) 594. As described above with respect to FIG. 2, in some examples a display device 210 may be configured to present an image that comprises multiple surfaces 240-242. According to these examples, a display device 210 may include storage space in memory used to stored data representing to the respective surfaces 240-242. According to these examples, SCM 594 may be configured to read a current frame of image data from each of the multiple surfaces, and combine the image data from the multiple surfaces to generate a single surface of modified image data that includes the image data from each of the multiple surfaces, as further described with respect to SCM 694 depicted in FIG. 6. In this manner, battery longevity of display device 320 may be prolonged, because instead of display driver 354 reading data from each of the multiple surfaces to present an image that has been determined to be static, display driver 354 may read the single, combined modified image data. Accordingly, an amount of power used to read image date from frame buffers 352 to present a static image via display 356 may be reduced.

Figure 6:
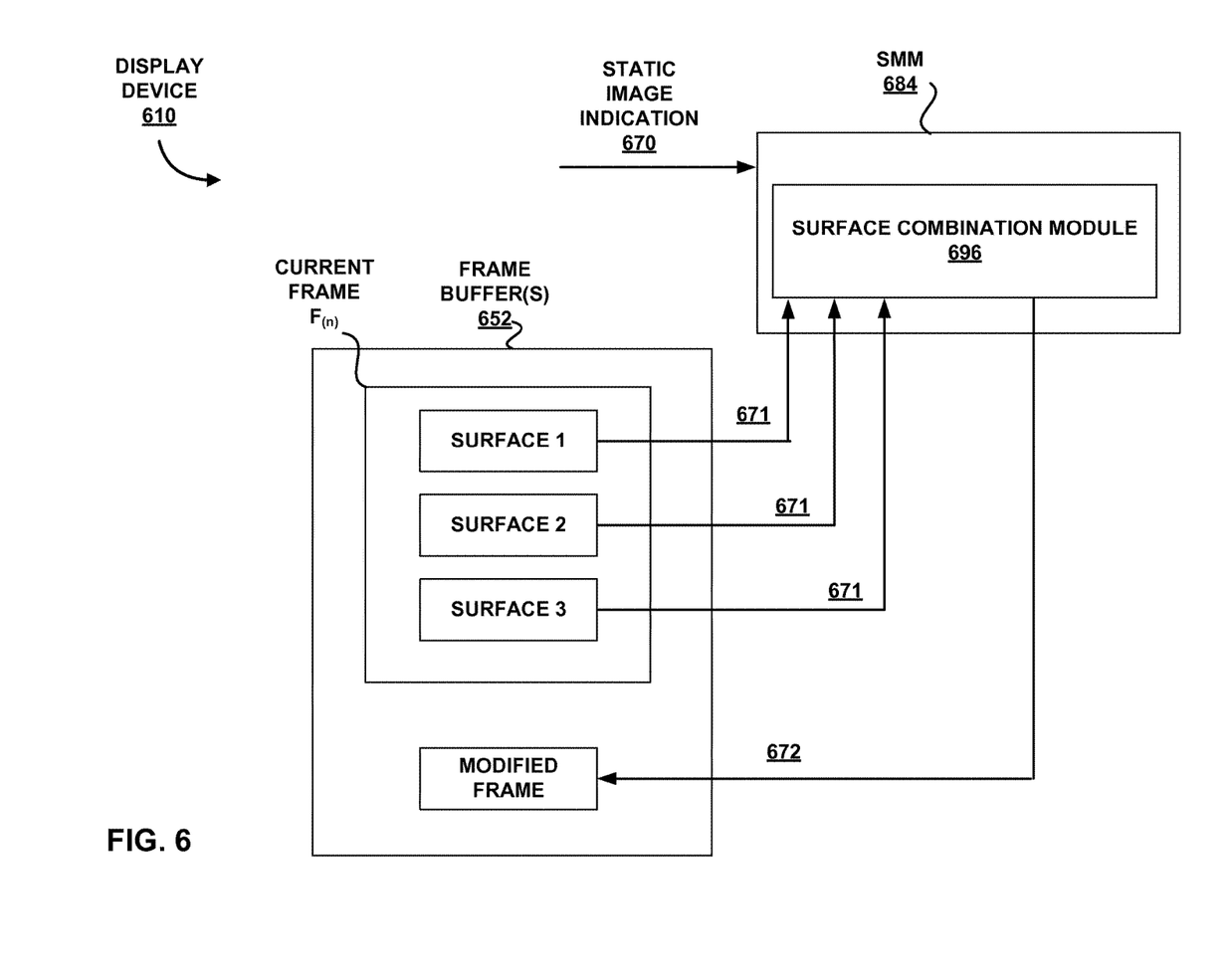
FIG. 6 is a block diagram that illustrates one example of a display device configured to present an image that includes multiple surfaces consistent with the techniques described herein.

FIG. 6 depicts one example of display device 610 that includes frame buffer(s) 652 that store data that represents multiple surfaces, surfaces 1-3. As depicted in FIG. 6, a current frame $F_n$ of image data may include image data associated with each of the multiple surfaces 1-3. As described above with respect to FIGS. 3 and 4, display device 610 may be configured to determine when a presented image comprising multiple surfaces 1-3 has become static, e.g., display device 610 may determine that each of the respective three surfaces has become static.

Also depicted in FIG. 6 is an SMM 684 that includes a surface combination module 696, which may correspond to surface combination module 596 depicted in FIG. 5. SMM may be configured to cause display device 610 to operate in a static image mode based on determining that the respective surfaces of a multi-surface image have become static. For example, as shown in FIG. 6, in response to determining that the multi-surface image has become static, SCM 696 may read a current frame of image data 671 associated with each of the multiple surfaces 1-3 of frame buffer(s) 652, and combine the image data 671 corresponding to each of the multiple surfaces into a single modified frame of image data 672. According to this example, SCM 696 may write the single modified frame of image data 672 to frame buffer(s)

652. According to this example, display driver 354 may read the single modified frame of image data 672 that includes a static image that represents each of the multiple surfaces 1-3 to present the static image. In this manner, display device 610 may use less power to present the static image comprising multiple surfaces 1-3, which may thereby improve a battery longevity of display device 610.

Referring back to FIG. 3, as described above, static image module 380 may be configured to determine if an image to be presented by display 356 has become static. If static image module 380 determines that the image to be presented by display has become static, static image module 380 may cause display device 320 to operate in a static image mode. The static image mode may include reducing a supply voltage and/or operating frequency of one or more components of display device 320, such as a display driver 354 of display device 320. As also described above, the static image mode may also include reading a current frame of image data (e.g., comprising a single image, corresponding to the example of FIG. 1, or a multi-surface image, corresponding to the example of FIG. 2) from frame buffer(s) 352, and modify the current frame of image data once to generate a modified frame of image data with a smaller size (i.e., a smaller number of bits) than the current frame of image data. According to the static image mode, static image module 380 may write the modified image data to the same frame buffer 352 (i.e., overwrite the current frame of image data), or write the modified image data to a different frame buffer 352. According to examples where the modified image data is written to a different frame buffer 352, static image module 380 may also cause display driver 354 to read the modified image data from the different frame buffer 352 than the current frame of image data is stored in. According to examples where the modified image data is written to the same frame buffer 352 as the current frame of image data (e.g., overwrite the current frame of image data), static image module 380 may not cause display driver 354 to read from a different frame buffer 352 to present the static image.

Referring again to FIG. 3, in some examples, static image module 380 may further be configured to determine when an image to be presented via display 356 is no longer static. For example, when display device 320 is operating in the static image mode as described above, static image module 380 (e.g., SIDM 382) may continue to compare current and previous frames of image data to one another, to determine whether there are any differences between the respective frames. As one example, static image module 380 may, while in the static image mode, continue to perform a CRC check on current and previous frames written to frame buffers 352 by display engine 350. In other examples, static image module 380 may, also or instead, determine when an image to be presented via a display 356 based on receiving one or more indications of a new image to be presented via display 356. For example, static module may determine when an image to be presented is no longer static based on an interrupt received from one or more of a software applications executing on a processor 363 of display device, a graphics processing module 362 of display device, or another source of image data received by display engine 350.

If static image module 380 determines that an image to be displayed is no longer static, static image module 380 (e.g., static mode module 384) may cause display device 320 to return to a standard operating mode to present images via display 356. For example, static image module 380 may increase a supply voltage and/or operating frequency of display driver 354 to levels consistent with a standard operating mode of display driver 354. As another example, static image module 380 may cause display driver 354 to read a new, current frame of image data from frame buffer(s) 352, instead of the previously generated and stored modified image data described above. In this manner, display device 320 may exit the static image mode, once display device 320 determines that an image to be presented via display 356 is no longer static.

As described above, in response to detecting a static image, display device 320 may operate in a static image mode. As described above, in such a static image mode, display device 320 may modify the current frame of the static image to generate a modified frame of image data with a reduced size compared to a size of the current frame. For example, display device 320 may modify the current frame of image to reduce a number of bits of the image according to one or more of the techniques described with respect to FIG. 6. According to these examples, in the static image mode, display device (e.g., display driver 354) may read the modified image data from frame buffer(s) 352 to present the static image. According to these examples, because the display driver 354 may read the modified image data with a reduced size, instead of the current frame of the static image described above, power consumed by the display engine to read the static image from the one or more frame buffers may be reduced. According to these examples, reducing power consumption of display device 320 (e.g., power consumption of display driver 354), by operating display device 320 in a static image mode as described above, may increase a battery life of power source 364, which may thereby improve a user experience when using display device 220.

In addition, according to the techniques of described herein, a display device 320 (e.g., static image module 380) may detect a static image by monitoring the contents of one or more frame buffer(s) 352 of the display device 320. In some examples, detecting a static image by monitoring the contents of one or more frame buffers as described herein may be advantageous, because display device 320 may detect a static image, regardless of a source of image data to be presented via display 356. For example, display device 320 may detect such a static image, regardless of whether the static image was received (e.g., by a display driver) from one or more software applications executing on a processor 363 of display device 320, a graphics processing module 362 of the display device 320, or another source of image data.

Figure 7:
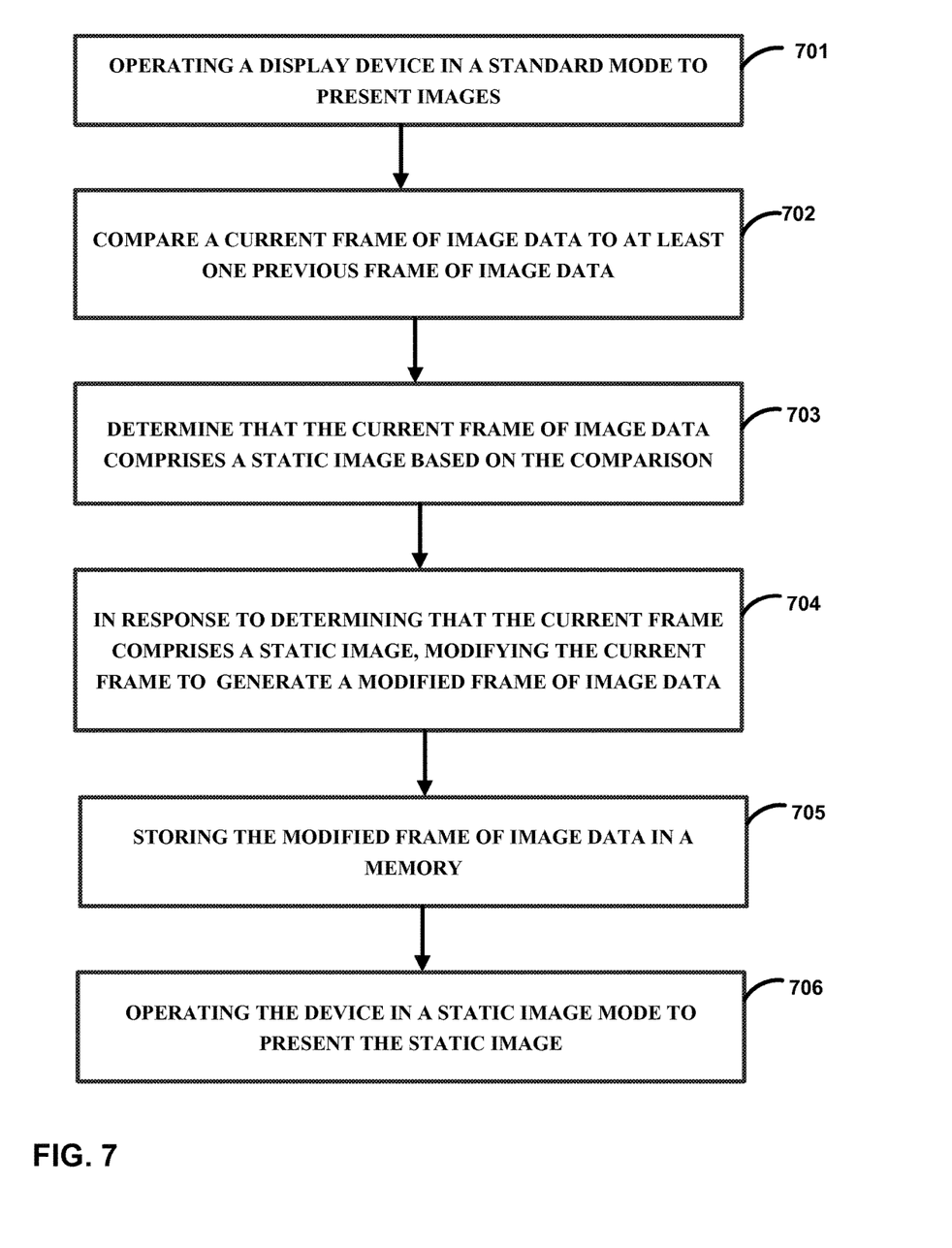
FIG. 7 is a flow diagram that illustrates one example of a method of operating a display device in a static image mode consistent with the techniques described herein.

FIG. 7 is a flow diagram that illustrates one example of a method of operating a display device in a static image mode consistent with the techniques described herein. The method of FIG. 7 is described herein as performed by display device 320 depicted in FIG. 3 for exemplary purposes only. Any device may be used to perform the method of FIG. 7.

As shown in FIG. 7, display device 320 may be in a standard mode to display images (701). As also shown in FIG. 7, display device 320 (e.g., SIDM 362) may compare a current frame of image data to at least one previous frame of image data (702). For example, display device 320 may include a CRC module 485 configured to perform a cyclic redundancy check on the current frame of image data and the at least one previous frame of image data to determine if there are any differences between the current frame and the at least one previous frame.

As also depicted in FIG. 7, display device 320 may determine that a current frame of image data comprises a static image based on the comparison (703). For example, display device 320 may include one or more counters 483 configured to count a number of sequential frames of image data that are substantially similar. According to this example, display device 320 may compare a value of the one or more counters 483 to at least one predetermined threshold, and determine that a current frame of image data comprises a static image if the value exceeds the predetermined threshold.

As also depicted in FIG. 7, display device 320 may, in response to determining that the current frame of image data comprises a static image, modify the current frame of image data to generate a modified frame of image data (704). For example, display device 320 (e.g., image modification module 487) may modify the current frame of image data to reduce a size of the modified frame of image data relative to the current frame. For example, display device 320 may reduce a size of the modified frame based on removing alpha data from the current frame of image data, converting a color space of the current frame of image data (e.g., from RGB color space to subsampled luminance and chrominance components), entropy encoding the image data, and/or combining a multi-surface image into a single image frame.

As also depicted in FIG. 7, display device 320 may store the modified frame of image data in memory (705). For example, display device 320 may store the modified frame of image data in the same frame buffer as the current frame of image data was stored (i.e., overwrite the current frame of image data), or in a different frame buffer (i.e., a different memory location) than the current frame of image data.

As also depicted in FIG. 7, display device 320 (e.g., static mode module 384) may operate in a static image mode (706). The static image mode includes operating the display device to read the modified frame of image data from the memory to present the static image. For example, the display device 320 may cause a display driver 354 of the display device to read the modified frame of image data from the memory, instead of the identified static current frame of image data.

The techniques described herein may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

Various examples have been described. These and other examples are within the scope of the following claims.

The invention claimed is:

1. A method comprising:
    operating a display device in a standard mode to display images, wherein the standard mode comprises reading one or more frames of image data from a memory device to present the images;
    comparing a current frame of image data to at least one previous frame of image data;
    determining that the current frame of image data comprises a static image based on the comparison;
    responsive to determining that the current frame of image data comprises a static image, modifying the current frame of image data to generate a modified frame of image data, wherein modifying the current frame to generate the modified frame comprises reducing a number of bits that represent the static image by at least converting the current frame from red green blue (RGB) color space to luminance and chrominance components such that a number of bits per pixel of the modified frame is reduced relative to the current frame;
    storing the modified frame of image data in the memory device; and
    operating the display device in a static image mode, wherein the static image mode comprises reading the modified frame of image data from the memory device to present the static image.

2. The method of claim 1, wherein operating the display device in the static image mode further comprises:
    reducing a clock rate of at least one component of the display device relative to a clock rate of the at least one component in standard mode of operation.

3. The method of claim 1, wherein operating the display device in the static image mode further comprises:
    reducing a voltage level of at least one component of the display device relative to a voltage level of the at least one component in the standard mode of operation.

4. The method of claim 1, wherein modifying the current frame of image data to generate the modified frame of image data comprises generating the modified frame of image data to have less data than the current frame of image data.

5. The method of claim 4, further comprising:
    reading the modified frame from the memory device until another frame of image data different than the current frame is to be displayed.

6. The method of claim 1, further comprising:
    modifying the current frame of image data to generate the modified frame of image data only once in response to determining that the current frame of image data comprises a static image based on the comparison.

7. The method of claim 1, wherein reducing the number of bits that represent the static image comprises entropy encoding the current frame.

8. The method of claim 7, wherein the current frame comprises a plurality of image surfaces, and wherein modifying the current frame of image data to generate a modified frame of image data comprises combining the plurality of image surfaces into a single surface of image data.

9. A display device, comprising:
    a static image module, comprising:

a standard mode module configured to operate the display device in a standard mode to display images, wherein the standard mode comprises reading one or more frames of image data from a memory device to present the images;

a static image determination module configured to:
  compare a current frame of image data to at least one previous frame of image data, and determine that the current frame of image data comprises a static image based on the comparison; and a static mode module configured to:
  responsive to determining that the current frame of image data comprises a static image, modify the current frame of image data to generate a modified frame of image data, wherein, to modify the current frame to generate the modified frame, the static image module is configured to reduce a number of bits that represent the static image by at least converting the current frame from red green blue (RGB) color space to luminance and chrominance components such that a number of bits per pixel of the modified frame is reduced relative to the current frame;
  store the modified frame of image data in the memory device; and
  operate the display device in a static image mode, wherein the static image mode comprises reading the modified frame of image data from the memory device to present the static image.

10. The device of claim 9, wherein, in the static image mode, the static mode module is configured to:
  reduce a clock rate of at least one component of the display device relative to a clock rate of the at least one component in standard mode of operation.

11. The device of claim 9, wherein, in the static image mode, the static mode module is configured to:
  reduce a voltage level of at least one component of the display device relative to a voltage level of the at least one component in the standard mode of operation.

12. The device of claim 9, wherein the static image module is configured to generate the modified frame of image data to have less data than the current frame of image data.

13. The device of claim 12, wherein the static image module is configured to cause the display device to:
  read the modified frame from the memory device until another frame of image data different than the current frame is to be displayed.

14. The device of claim 9, wherein the static image mode module is configured to:
  modify the current frame of image data to generate the modified frame of image data only once in response to determining that the current frame of image data comprises a static image based on the comparison.

15. The device of claim 9, wherein the static mode module is configured to entropy encode the current frame.

16. The device of claim 15, wherein the current frame comprises a plurality of image surfaces, and wherein the static mode module is configured to generate a modified frame of image data by combining the plurality of image surfaces into a single surface of image data.

17. A display device, comprising:
  means for operating a display device in a standard mode to display images, wherein the standard more comprises reading one or more frames of image data from a memory device to present the images;
  means for comparing a current frame of image data to at least one previous frame of image data;
  means for determining that the current frame of image data comprises a static image based on the comparison;
  means for, responsive to determining that the current frame of image data comprises a static image, modifying the current frame of image data to generate a modified frame of image data, wherein the means for modifying the current frame to generate the modified frame comprise means for reducing a number of bits that represent the static image that include means for converting the current frame from red green blue (RGB) color space to luminance and chrominance components such that a number of bits per pixel of the modified frame is reduced relative to the current frame;
  means for storing the modified frame of image data in the memory device; and
  means for operating the display device in a static image mode, wherein the static image mode comprises reading the modified frame of image data from the memory device to present the static image.

18. The device of claim 17, further comprising:
  means for reducing a clock rate of at least one component of the display device relative to a clock rate of the at least one component in standard mode of operation.

19. The device of claim 17, further comprising:
  means for reducing a voltage level of at least one component of the display device relative to a voltage level of the at least one component in the standard mode of operation.

20. The device of claim 17, further comprising:
  means for generating the modified frame of image data to have less data than the current frame of image data.

21. The device of claim 20, further comprising:
  means for reading the modified frame from the memory device until another frame of image data different than the current frame is to be displayed.

22. The device of claim 17, further comprising:
  means for modifying the current frame of image data to generate the modified frame of image data only once in response to determining that the current frame of image data comprises a static image based on the comparison.

23. The device of claim 17, further comprising:
  means for entropy encoding the current frame.

24. The device of claim 23, wherein the current frame comprises a plurality of image surfaces, and further comprising:
  means for combining the plurality of image surfaces into a single surface of image data to generate the modified frame.

25. A non-transitory computer-readable storage medium that stores instructions configured to cause a computing device to:
  operate a display device in a standard mode to display images, wherein the standard mode comprises reading one or more frames of image data from a memory device to present the images;
  compare a current frame of image data to at least one previous frame of image data;
  determine that the current frame of image data comprises a static image based on the comparison;
  responsive to determining that the current frame of image data comprises a static image, modify the current frame of image data to generate a modified frame of image data, wherein the instructions that cause the computing device to modify the current frame to generate the modified frame comprise instructions that cause the computing device to reduce a number of bits that represent the static image by at least converting the current frame from red green blue (RGB) color space to luminance and chrominance components such that a number of bits per pixel of the modified frame is reduced relative to the current frame;

store the modified frame of image data in the memory device; and operate the display device in a static image mode, wherein the static image mode comprises reading the modified frame of image data from the memory device to present the static image.

26. The non-transitory computer-readable storage medium of claim 25, wherein the instructions further cause the computing device to:

in the static image mode, reduce a clock rate of at least one component of the display device relative to a clock rate of the at least one component in standard mode of operation.

27. The non-transitory computer-readable storage medium of claim 25, wherein the instructions further cause the computing device to:

in the static image mode, reduce a voltage level of at least one component of the display device relative to a voltage level of the at least one component in the standard mode of operation.

28. The non-transitory computer-readable storage medium of claim 25, wherein the instructions further cause the computing device to:

generate the modified frame of image data to have less data than the current frame of image data.

29. The non-transitory computer-readable storage medium of claim 25, wherein the instructions further cause the computing device to:

read the modified frame from the memory device until another frame of image data different than the current frame is to be displayed.

30. The non-transitory computer-readable storage medium of claim 25, wherein the instructions further cause the computing device to:

modify the current frame of image data to generate the modified frame of image data only once in response to determining that the current frame of image data comprises a static image based on the comparison.

31. The non-transitory computer-readable storage medium of claim 25, wherein the instructions further cause the computing device to:

entropy encode the current frame.

32. The non-transitory computer-readable storage medium of claim 31, wherein the current frame comprises a plurality of image surfaces, and wherein the instructions further cause the computing device to:

generate a modified frame of image data by combining the plurality of image surfaces into a single surface of image data.

33. The method of claim 1, wherein reading a frame of the one or more frames of image data from the memory device to present an image in the standard mode consumes more power from a battery of the display device than reading the modified frame of image data from the memory device to present the static image in the static image mode.

* * * * *